(12) United States Patent
Narang et al.

(10) Patent No.: US 12,602,546 B2
(45) Date of Patent: Apr. 14, 2026

(54) KEY POINTS EXTRACTION FOR UNIFORM RESOURCE LOCATORS

(71) Applicant: Microsoft Technology Licensing, LLC, Redmond, WA (US)

(72) Inventors: Mridu Baldevraj Narang, Redmond, WA (US); Xuenan Guo, Bellevue, WA (US); Shubham Tripathi, Redmond, WA (US); Guihong Cao, Bellevue, WA (US); Zicheng Huang, Bothell, WA (US); Xiaodong Fan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 479 days.

(21) Appl. No.: 18/081,410

(22) Filed: Dec. 14, 2022

(65) Prior Publication Data

US 2024/0202440 A1 Jun. 20, 2024

(51) Int. Cl.
| | |
|---|---|
| *G06F 40/279* | (2020.01) |
| *G06F 40/12* | (2020.01) |
| *G06N 3/08* | (2023.01) |

(52) U.S. Cl.
CPC ............ *G06F 40/279* (2020.01); *G06F 40/12* (2020.01); *G06N 3/08* (2013.01)

(58) Field of Classification Search
CPC .......... G06F 40/279; G06F 40/12; G06N 3/08
See application file for complete search history.

(56) References Cited

U.S. PATENT DOCUMENTS

| | | | |
|---|---|---|---|
| 9,432,242 B1 | 8/2016 | Cierniak | |
| 10,621,237 B1 | 4/2020 | Rathnavelu | |
| 11,269,969 B1* | 3/2022 | Moreau-Arnott | ..... G06F 40/258 |
| 11,934,781 B2* | 3/2024 | He | ........................... G06N 7/01 |
| 2002/0143659 A1 | 10/2002 | Keezer et al. | |
| 2003/0212762 A1 | 11/2003 | Barnes | |
| 2005/0050462 A1 | 3/2005 | Whittle et al. | |
| 2005/0066018 A1 | 3/2005 | Whittle | |
| 2006/0036966 A1 | 2/2006 | Yevdayev | |
| 2006/0069808 A1 | 3/2006 | Mitchell et al. | |
| 2007/0250468 A1 | 10/2007 | Pieper | |
| 2009/0046584 A1 | 2/2009 | Garcia et al. | |
| 2009/0049370 A1 | 2/2009 | Faris | |

(Continued)

FOREIGN PATENT DOCUMENTS

| | | |
|---|---|---|
| CA | 2873733 A1 | 11/2013 |
| WO | 2005022333 A2 | 3/2005 |

(Continued)

OTHER PUBLICATIONS

Steinacker, Achim, Amir Ghavam, and Ralf Steinmetz. "Metadata standards for web-based resources." IEEE MultiMedia 8.1 (2001):70-76. (Year: 2001).*

(Continued)

*Primary Examiner* — Bhavesh M Mehta
*Assistant Examiner* — Joseph J. Yamamoto
(74) *Attorney, Agent, or Firm* — Ray Quinney & Nebeker P.C.; Tiffany B. Healy

(57) ABSTRACT

The present disclosure relates to systems and methods for identifying webpage key points for a webpage. The systems and methods present the webpage key points in a side pane of a browser adjacent to the webpage.

20 Claims, 8 Drawing Sheets

(56) References Cited

U.S. PATENT DOCUMENTS

| | | | |
|---|---|---|---|
| 2009/0049380 A1 | 2/2009 | Rehling | |
| 2009/0106201 A1 | 4/2009 | White et al. | |
| 2009/0282013 A1 | 11/2009 | Joshi | |
| 2009/0313536 A1 | 12/2009 | Karidi | |
| 2010/0082594 A1 | 4/2010 | Bhat | |
| 2010/0169364 A1 | 7/2010 | Hardt | |
| 2010/0332967 A1 | 12/2010 | Kraft | |
| 2011/0078615 A1 | 3/2011 | Bier | |
| 2011/0252060 A1 | 10/2011 | Broman et al. | |
| 2011/0252329 A1 | 10/2011 | Broman | |
| 2011/0252342 A1 | 10/2011 | Broman | |
| 2013/0066814 A1 | 3/2013 | Bosch et al. | |
| 2013/0110825 A1 | 5/2013 | Henry | |
| 2014/0372563 A1 | 12/2014 | Ke et al. | |
| 2015/0331575 A1 | 11/2015 | Fernandez-Ruiz | |
| 2017/0277668 A1* | 9/2017 | Luo | G06F 16/345 |
| 2018/0246983 A1 | 8/2018 | Rathod | |
| 2018/0341716 A1 | 11/2018 | Iyer | |
| 2019/0114056 A1 | 4/2019 | Gandhi et al. | |
| 2020/0210521 A1 | 7/2020 | Hutchins | |
| 2020/0351314 A1 | 11/2020 | Butcher et al. | |
| 2021/0383127 A1* | 12/2021 | Kikin-Gil | G06F 18/256 |
| 2023/0125087 A1 | 4/2023 | Jia et al. | |
| 2024/0045911 A1* | 2/2024 | Ye | G06F 16/9566 |

FOREIGN PATENT DOCUMENTS

| | | | |
|---|---|---|---|
| WO | 2012073037 A2 | 6/2012 | |
| WO | 2013067462 A1 | 5/2013 | |
| WO | 2018217402 A1 | 11/2018 | |

OTHER PUBLICATIONS

"Notice of Allowance Issued in U.S. Appl. No. 17/556,989", Mailed Date: Jul. 12, 2023, 6 Pages.

"International Search Report and Written Opinion Issued in PCT Application No. PCT/US22/044472", Mailed Date: Jan. 25, 2023, 11 Pages.

"Non Final Office Action Issued in U.S. Appl. No. 17/556,989", Mailed Date: Mar. 6, 2023, 14 Pages.

Non-Final Office Action mailed on Mar. 13, 2025, in U.S. Appl. No. 18/482,465, 14 pages.

Examination Report Received in Indian Patent Application No. 202447039169, mailed on Aug. 1, 2025, 09 pages.

Final Office Action mailed on Jun. 27, 2025, in U.S. Appl. No. 18/482,465, 16 pages.

Notice of Allowance mailed on Sep. 11, 2025, in U.S. Appl. No. 18/482,465, 5 pages.

"Black Bear", Retrieved from: https://web.archive.org/web/20211118204548/https://defenders.org/wildlife/black-bear, Nov. 18, 2021, 5 Pages.

"Seattle Seahawks", Retrieved from: https://en.wikipedia.org/wiki/Seattle_Seahawks, Dec. 8, 2021, 31 Pages.

"Final Office Action Issued in U.S. Appl. No. 17/556,989", Mailed Date: Aug. 24, 2022, 10 Pages.

"Non Final Office Action Issued in U.S. Appl. No. 17/556,989", Mailed Date: May 10, 2022, 10 Pages.

Fitch, Chris, "Under A White Sky: The Nature Of The Future By Elizabeth Kolbert Book Review", Retrieved from: https://geographical.co.uk/reviews/books/item/4027-under-a-white-sky-the-nature-of-the-future-by-elizabeth-kolbert-book-review, Apr. 29, 2021, 13 Pages.

Goodson, Amy, "Halibut Fish: Nutrition, Benefits and Concerns", Retrieved from: https://web.archive.org/web/20210516150156/https://www.healthline.com/nutrition/halibut-fish, May 16, 2021, 19 Pages.

Rodgers, Michael, "Is the Oculus VR headset worth it?", Retrieved from: https://www.chicagotribune.com/consumer-reviews/sns-bestreviews-tech-oculus-vr-headset-worth-it-20210507-xee2kewkpjfmbfi43eoydagkgy-story. html, May 7, 2021, 8 Pages.

Todd, Carolyn L., "Long COVID Symptoms Are Common-Even After Mild or Asymptomatic Cases, New Study Shows", Retrieved from: https://www.msn.com/en-US/health/medical/long-covid-symptoms-are-common-even-after-mild-or-asymptomatic-cases-new-study-shows/ar-AAL9X8z, Jun. 17, 2021, 6 pages.

Woodrow, Christy, "Yellowstone National Park Camping Tips", Retrieved from: https://web.archive.org/web/20210306231750/https://ordinarytraveler.com/tipsarticles/tips-hiking-camping-yellowstone-national-park, Mar. 6, 2021, 38 Pages.

* cited by examiner

500

| Receiving a uniform resource locator (URL) for a webpage | 502 |

| Identifying webpage key points for the webpage in response to a selection threshold being satisfied for the webpage | 504 |

| Causing the webpage key points to be presented adjacent to the webpage in a side pane of a browser | 506 |

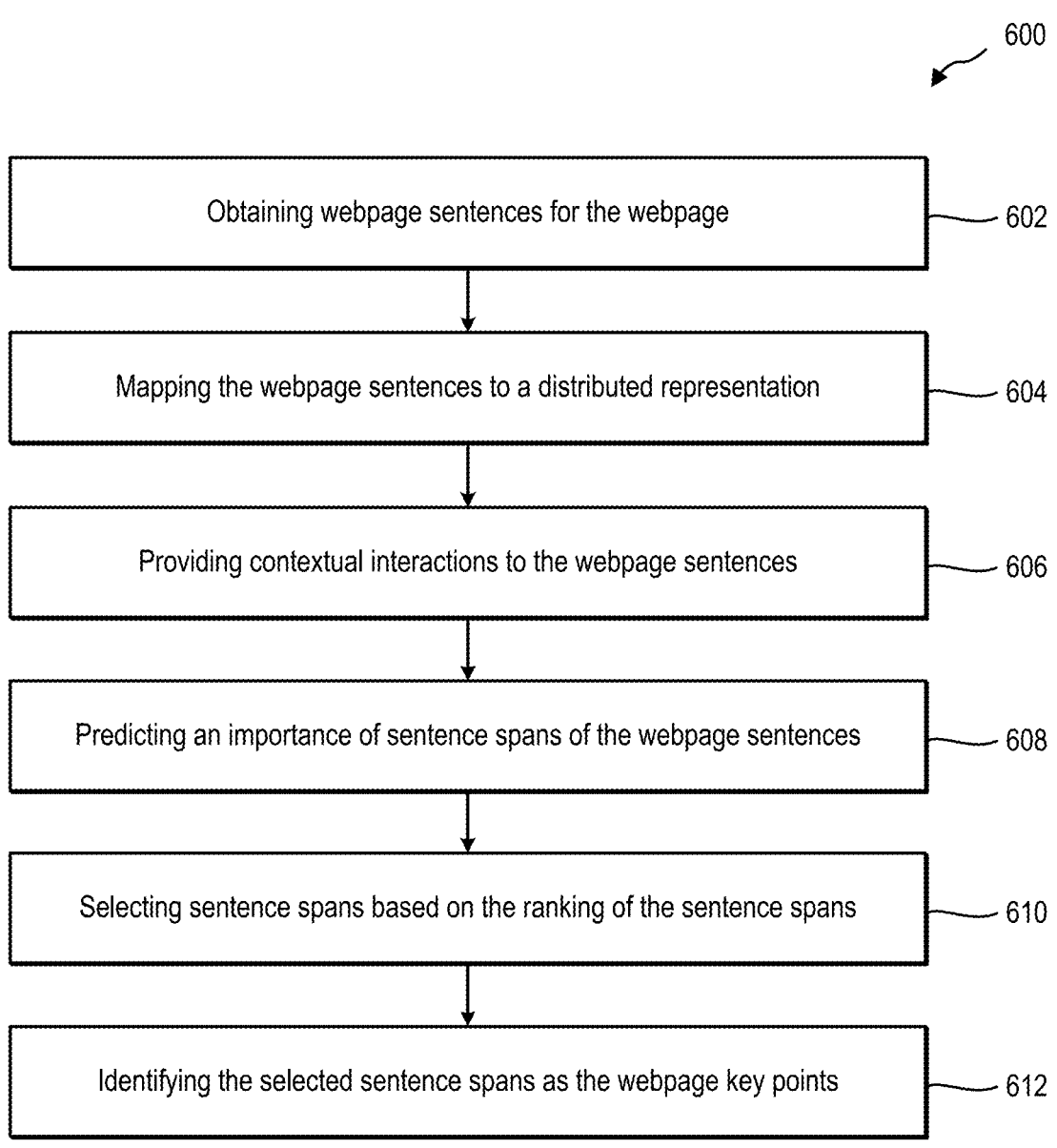

600

Obtaining webpage sentences for the webpage — 602

Mapping the webpage sentences to a distributed representation — 604

Providing contextual interactions to the webpage sentences — 606

Predicting an importance of sentence spans of the webpage sentences — 608

Selecting sentence spans based on the ranking of the sentence spans — 610

Identifying the selected sentence spans as the webpage key points — 612

FIG. 6

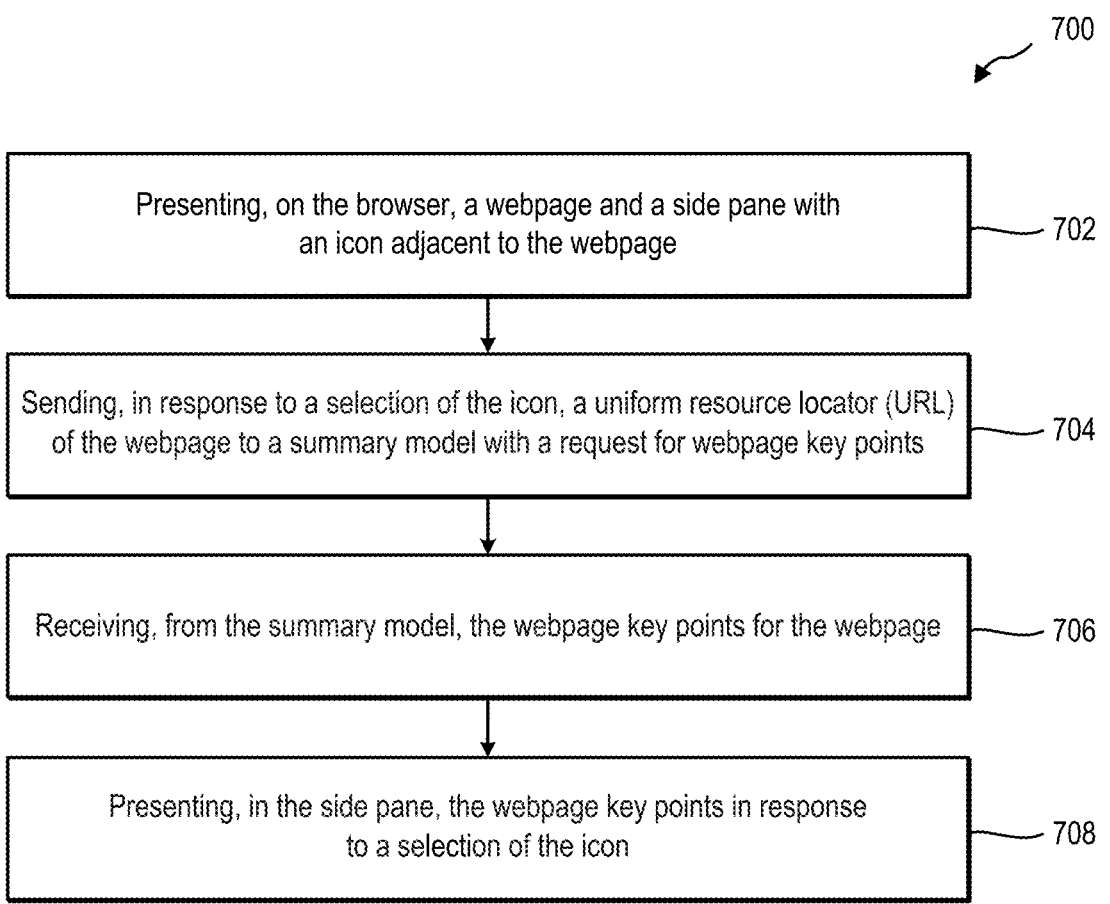

700

Presenting, on the browser, a webpage and a side pane with
an icon adjacent to the webpage — 702

Sending, in response to a selection of the icon, a uniform resource locator (URL)
of the webpage to a summary model with a request for webpage key points — 704

Receiving, from the summary model, the webpage key points for the webpage — 706

Presenting, in the side pane, the webpage key points in response
to a selection of the icon — 708

Memory *803*

Instructions *805*

Data *807*

Input Device(s) *811*

Output Device(s) *813*

Processor *801*

Display Device *815*

Communication Interface(s) *809*

Display Controller *817*

819

KEY POINTS EXTRACTION FOR UNIFORM RESOURCE LOCATORS

BACKGROUND

Users engage with browsers for content discovery, for example, by viewing different webpages or watching multimedia content (photos, videos, images). When users engage with browsers, the users may have multiple tabs open and may switch between different webpages open on the different tabs. The users may quickly move from one webpage to another webpage without spending a lot of time reading the content of the webpage.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes receiving a uniform resource locator (URL) of a webpage presented on a browser. The method includes determining that a selection threshold is satisfied for the webpage based on a webpage title of the webpage and content of the webpage. The method includes identifying, using a machine learning model, webpage key points for the webpage, wherein the webpage key points are obtained from the webpage. The method includes causing the webpage key points to be presented adjacent to the webpage in a side pane of the browser.

Some implementations relate to a device. The device includes a processor; memory in electronic communication with the processor; and instructions stored in the memory, the instructions being executable by the processor to: receive a uniform resource locator (URL) of a webpage presented on a browser; determine that selection threshold is satisfied for the webpage based on a webpage title of the webpage and content of the webpage; identify webpage key points for the webpage in response to the selection threshold being satisfied for the webpage, wherein the webpage key points are obtained from the webpage; and cause the webpage key points to be presented in a side pane of a browser nearby the webpage.

Some implementations relate to a method. The method includes presenting, on a browser, a webpage and a side pane with an icon adjacent to the webpage. The method includes sending, in response to a selection of the icon, a uniform resource locator (URL) of the webpage to a summary model with a request for webpage key points. The method includes receiving, from the summary model based on the URL of the webpage, the webpage key points for the webpage, wherein the webpage key points are obtained from content of the webpage. The method includes presenting, in the side pane, the webpage key points in response to a selection of the icon.

Some implementations relate to a device. The device includes a processor; memory in electronic communication with the processor; and instructions stored in the memory, the instructions being executable by the processor to: present, on a browser, a webpage and a side pane with an icon adjacent to the webpage; send, in response to a selection of the icon, a uniform resource locator (URL) of the webpage to a summary model with a request for webpage key points; receive, from the summary model based on the URL of the webpage, the webpage key points for the webpage, wherein the webpage key points are obtained from content of the webpage; and present, in the side pane, the webpage key points in response to a selection of the icon.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 6 illustrates an example method for identifying webpage key points in accordance with implementations of the present disclosure.

FIG. 7 illustrates an example method for presenting webpage key points in accordance with implementations of the present disclosure.

DETAILED DESCRIPTION

Figure 1:
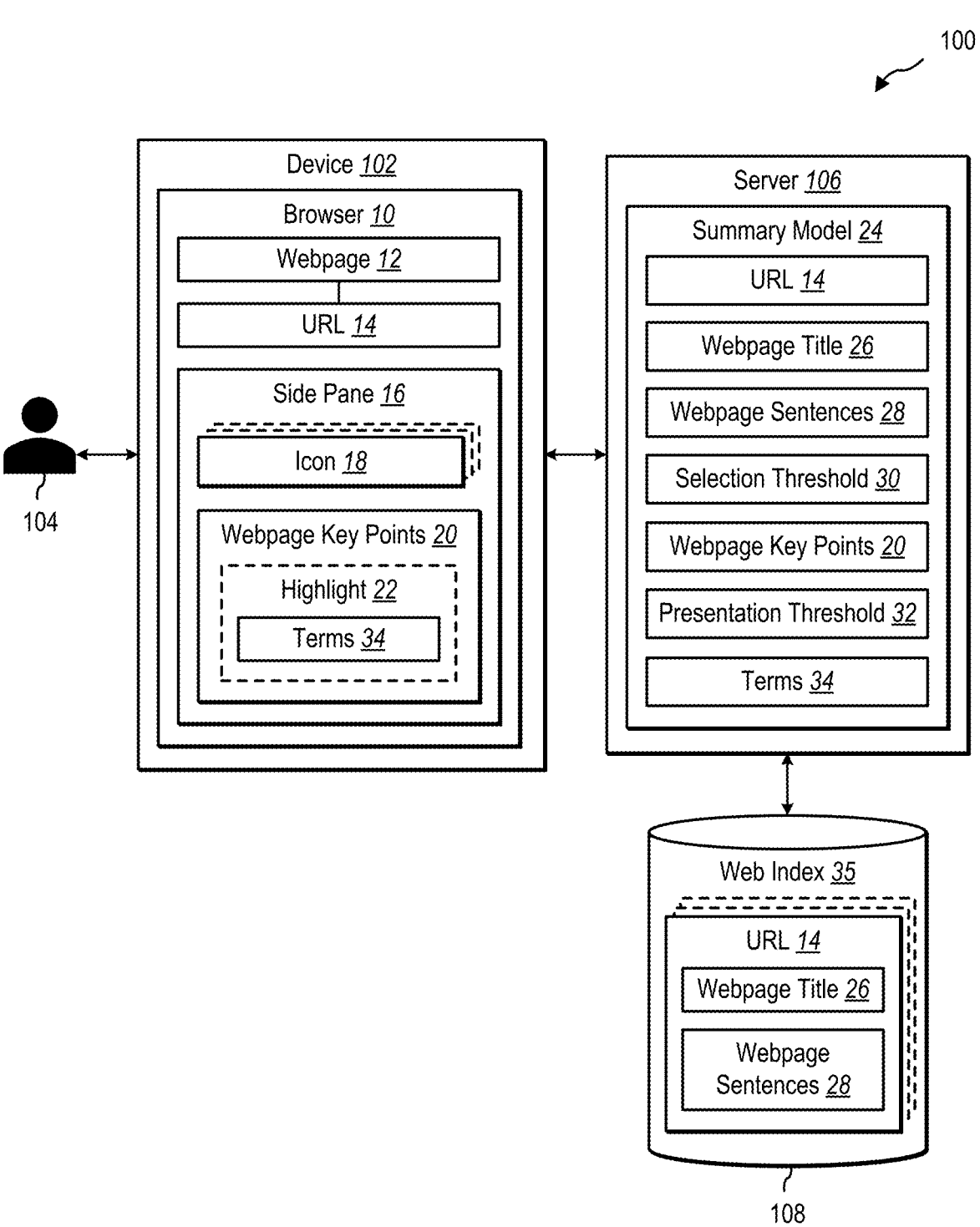
FIG. 1 illustrates an example environment for identifying webpage key points in accordance with implementations of the present disclosure.

This disclosure generally relates to automated summary generation of webpages being viewed or engaged with by a user. Users engage with browsers for content discovery, for example, by viewing different webpages or watching multimedia content (photos, videos, images). Users spend a lot of time browsing content on the web. With the information overload it becomes harder to assimilate information and make decisions if the webpage is relevant enough for users to spend time reading. When users engage with browsers, the users may have multiple tabs open and may switch between different webpages open on the different tabs. The users may quickly move from one webpage to another webpage without spending a lot of time reading the content of the webpage. Current solutions may provide hand-crafted headlines of news articles to users to aid the users in engaging with the content of the webpages. However, hand-crafted headlines are generally provided by the content provider of the webpages and may not provide an accurate summary of the information contained in the webpages. Current solutions also try to provide an editorially created summary for news articles on a webpage, which does not have wide coverage across webpages or different domains of webpages.

The methods and systems of the present disclosure identify key points of information of text heavy webpages being viewed or engaged with by a user. The methods and systems extract key points from text heavy content from any open domain URL and render the key points to the user on a browser. The methods and systems are agnostic to document type or domain. The methods and systems are directed to surfacing, based on the content within an individual webpage, facts that are relevant to a user.

The methods and systems use machine learning models to determine whether to provide a summary of key points for the webpage. Examples of webpages that may benefit from a summary include webpage with enough content to summarize, webpages with a correct type of content to summarize, webpages with a long document, webpages with a long portable document format (PDF), webpages with news articles, webpages with educational articles, and/or webpages with dense text or that require more time investment from users. Example of webpages that may not benefit from a summary include webpages with lyrics, webpages with lists, and/or webpages with videos or audio.

The machine learning models extract key points automatically from the webpages in response to determining that the webpage is summary worthy (e.g., the webpage may benefit from a summary). In some implementations, the methods and systems implement a neural network model that maps sentences of web pages into individual distributed representations, models the sentences contextual interactions, and predicts an importance of all possible adjacent sentence spans. In some implementations, the key points are adjacent sentences with skipping, representing important content in the webpage with a short amount of text. The methods and systems may handle webpages with arbitrary lengths. In addition, the methods and systems are open-domain and are applicable to different types of webpages.

The methods and systems present the key points in near real time in response to the user requesting the URL of the webpage. In some implementations, the key points are presented in a sidebar adjacent to the webpage. The key points provide an overview of the information contained in the webpage to the user. In addition, the key points capture representative sentences or phrases from the webpage to represent the page information in bullets. The key points may also aid the user in deciding whether to read the webpage.

One technical advantage of the methods and systems of the present disclosure is automatically extracting key points from the content of the webpage. The methods and systems are based on automatic summary generation of the webpage, which is scalable and timely, as compared to hand-crafted headlines of the webpage. Another technical advantage of the methods and systems of the present disclosure is scalability of the methods and systems. Another technical advantage of the methods and systems of the present disclosure is reusing sentence encodings generated for the webpages to provide the key points more quickly. Another technical advantage is the methods and systems of the present disclosure are applicable to any domain and different types of webpages. The methods and systems of the present disclosure help users with exploratory searches and knowledge consumption sessions using a browser, resulting in aiding the productivity of the users.

One example use case of the methods and systems of the present disclosure includes a user opens a webpage with a news article on a browser. The methods and systems automatically identify the key points of the news article by analyzing the webpage sentences of the news article and presents the key points of the news article in a side pane of the browser. The key points are sentences or phrases obtained from the news article that provides a summary of the news included in the webpage. The user may read the key points instead of the entire news article to quickly understand what information is contained in the news article. In addition, the key points may aid the user in deciding whether the user wants to read details of the news article at the same time as having a good overview of the webpage from the key points.

Another example use case of the methods and systems of the present disclosure includes a user opens a webpage with a long blog. The methods and systems determine that the webpage is a summary worthy webpage based on the length of the blog and/or the content of the blog. The methods and systems automatically identify the key points of the blog in response to determining that the webpage is a summary worth webpage. The key points are sentences or phrases obtained directly from the content of the blog that provide a summary of the information contained in the blog. The key points are presented in a side pane of the browser. The user may read the key points instead of the blog to get an overview of the information contained in the blog. The key points may help the user in deciding whether to read the blog.

Referring now to FIG. 1, illustrated is an example environment 100 for identifying and presenting key points for a webpage. The environment 100 may include one or more users 104 interacting with one or more devices 102 to access a browser 10. The browser 10 allows the users 104 to interact with information on the World Wide Web. When a user 104 requests a webpage 12 from a website (e.g., by performing a search using the browser 10 or entering in a uniform resource locator (URL) 14 of a website using the browser 10), the browser 10 retrieves the content of the webpage 12 from a webserver and displays the webpage 12 on a display of the device 102. The webpage 12 may be any webpage (third party webpages or webpages from the same party that provides the browser 10). In addition, the browser 10 may be a browser application on the device 102 of the user 104. Examples of browsers 10 include EDGE™ and INTERNET EXPLORER™.

The browser 10 may have a user interface rendering component that presents the requested webpage 12 on the display. The user interface rendering component may also present a side pane 16 with icons 18 that the user 104 may select to present additional information or content. The user 104 may select the icon 18 on the side pane 16 to trigger presentation of the side pane 16 with the additional information or content. The side pane 16 may be presented next to or adjacent to the webpage 12. For example, the side pane 16 is presented by the user interface rendering component on a right side of the webpage 12. The side pane 16 may be positioned at the right rail of the browser 10 with the additional information or content. The side pane 16 is opened either reactively by the user 104 or automatically as a companion canvas for the user's 104 currently browsed webpage 12.

In some implementations, the user 104 selects the icon 18 to trigger presentation of webpage key points 20 in the side pane 16. The browser 10 sends a request with the URL 14 of the webpage 12 to a server 106 for the webpage key points 20. In some implementations, the browser 10 sends the request for the webpage key points 20 in response to the user 104 selecting the icon 18. In some implementations, the browser 10 automatically sends the request for the webpage key points 20 in response to the user 104 selecting the URL 14 for the webpage 12.

The server 106 includes a summary model 24 that receives the request with the URL 14 of the webpage 12 for the webpage key points 20 and automatically identifies the webpage key points 20. The summary model 24 obtains the webpage title 26 and the webpage sentences 28 for the URL 14 from a web index 35 stored in a datastore 108. The summary model 24 uses the webpage title 26 and the webpage sentences 28 to automatically identify the webpage key points 20 that provide a summarization of content from the webpage 12. The summary model 24 is a trained machine learning model that receives the webpage title 26 and the webpage sentences 28 as input and analyzes the webpage sentences 28 in the context of the webpage title 26 to identify the webpage key points 20.

In some implementations, the summary model 24 uses a selection threshold 30 to determine whether to identify the webpage key points 20. The selection threshold 30 is used by the summary model 24 to identify whether to provide a summarization of the webpage 12 based on the webpage title 26 and/or the content of the webpage 12. The selection threshold 30 indicates whether the webpage 12 is a good candidate to summarize (e.g., the webpage has enough content to summarize, a correct type of content to summarize, the webpage is a long document, and/or the webpage is a text dense or content dense webpage that needs more time investment from users).

An example of a webpage 12 that is a good candidate for summarization includes news articles. Another example of a webpage 12 that is a good candidate for summarization includes scientific articles. Another example of a webpage 12 that is a good candidate for summarization includes a lengthy blog post. Another example of a webpage 12 that is a good candidate for summarization includes how-to-pages. Another example of a webpage 12 that is a good candidate for summarization includes lengthy portable document format (PDF). Another example of a webpage 12 that is a good candidate for summarization includes educator articles. An example of a webpage 12 that is a not a good candidate for summarization is lyrics to a song. Another example of a webpage 12 that is not a good candidate for summarization is a list of items. Another example of a webpage 12 that is not a good candidate for summarization is a video webpage. For example, the selection threshold 30 is a configurable threshold that is a positive number between 0 and 1 and the output is a positive number between 0 and 1. If the output is below the selection threshold 30, the summary model 24 skips identifying the webpage key points 20 for the webpage 12. For example, the summary model 24 returns a notification indicating that the webpage key points 20 are unavailable for the webpage 12.

If the output is equal to or above the selection threshold 30, the summary model 24 proceeds with identifying the webpage key points 20 for the webpage 12. The webpage key points 20 are sentences or phrases obtained from the content of the webpage 12 that summarize content from the webpage 12. The webpage key points 20 capture key representative sentences or phrases to represent the webpage 12 information in bullets. The summary model 24 uses the webpage title 26 to aid in deciding which sentence spans to select for the webpage key points 20. The webpage title 26 may depict what the content of the webpage 12 is using a small context representation and the webpage title 26 may bias the summary of the webpage 12 and selecting which sentence spans to use for the webpage key points 20 to capture the intent of the webpage title 26.

In some implementations, the webpage key points 20 are a plurality of adjacent sentences. In some implementations, the webpage key points 20 are sentences from different portions of the webpage 12 (e.g., sentences with skipping between them). The sentences or phrases used to provide the webpage key points 20 may be from different portions of the webpage 12. In some implementations, the summary model 24 identifies a minimum amount of text for the webpage key points 20 to provide a summary of content from the webpage 12. Thus, the summary model 24 consumes the content of the webpage 12 by analyzing the webpage sentences 28 and outputs the webpage key points 20.

The summary model 24 provides the webpage key points 20 to the browser 10 in near real time of receiving the request with the URL 14 of the webpage 12. In some implementations, the summary model 24 uses a presentation threshold 32 to determine whether to provide the webpage key points 20 to the browser 10 for presentation. For example, the presentation threshold 32 is a configurable threshold that is a positive number between 0 and 1. The presentation threshold 32 may be used by the summary model 24 to determine whether the webpage key points 20 provide a good summary of the webpage 12. The summary model 24 may analyze the webpage key points 20 and provide an output based on the analysis of the webpage key points 20.

In some implementations, the summary model 24 analyzes a summary length of the webpage key points 20. If the length of the webpage key points 20 is too long (e.g., the information is hard to consume), the summary model 24 may output a value below the presentation threshold 32. If the length of the webpage key points 20 is too short (e.g., not enough information is provided in the webpage key points 20), the summary model 24 may output a value below the presentation threshold 32. If the length of the webpage key points 20 provides enough information without making the summary too long, the summary model 24 may output a value above the presentation threshold 32.

In some implementations, the summary model 24 analyzes the content of the webpage key points 20. If the content of the webpage key points 20 is unclear (e.g., does not make sense collectively), the summary model 24 may output a value below the presentation threshold 32. If the content of the webpage key points 20 is clear (e.g., easy to understand collectively), the summary model 24 may output a value above the presentation threshold 32. If the content of the webpage key points 20 is less similar to the overall content of the webpage 12, the summary model 24 may output a value below the presentation threshold 32. For example, the webpage 12 discusses many different topics and while the webpage 12 is summary worthy (e.g., a long webpage 12 with content that can be summarized), it may be difficult to obtain a satisfactory summary within a short length of a summary because of the different topics discussed in the webpage 12.

In some implementations, the summary model 24 analyzes presentation issues of the webpage key points 20. If the webpage key points 20 have extraction issues that may cause rendering issues or make the experience look bad, the summary model 24 may output a value below the presentation threshold 32. If the webpage key points 20 present nicely (e.g., look as expected or render as expected), the summary model 24 may output a value above the presentation threshold 32.

The summary model 24 may use a single factor (e.g., summary length, content of the webpage key points, and/or presentation issues) in determining the output or any combination of factors (e.g., summary length, summary content, and/or presentation issues) in determining the output. In addition, the summary model 24 may apply different weights to different factors in determining the output. If the output is below the presentation threshold 32, the summary model 24 may skip sending the webpage key points 20 to the browser 10 for presentation. For example, the summary model 24 may send a notification indicating that the webpage key points 20 are unavailable for the webpage 12. If the output is equal to, or exceeds, the presentation threshold 32, the summary model 24 sends the webpage key points 20 to the browser 10 for presentation.

The browser 10 receives the webpage key points 20 and presents the webpage key points 20 in the side pane 16 adjacent to the webpage 12. The browser 10 presents the webpage key points 20 in the side pane 16 in near real time in response to the user 104 requesting the URL 14 of the webpage 12.

In some implementations, the summary model 24 identifies terms 34 in the webpage key points 20 to highlight. For example, the identified terms 34 are phrases or quotes in the webpage key points 20. Another example includes the identified terms 34 are locations discussed in the webpage 12. Another example includes the identified terms 34 are statistics mentioned in the webpage 12. The browser 10 presents the webpage key points 20 in the side pane 16 with a highlight 22 for the identified terms 34. The highlight 22 visually distinguishes the identified terms 34 in the webpage key points 20. For example, the highlight 22 bolds the identified terms 34. Another example includes the highlight 22 changes the color of the identified terms 34. Another example includes the highlight 22 adds a color overlay to the identified terms 34.

The webpage key points 20 presented in the side pane 16 may aid the user 104 in easily understanding what information is covered in the webpage 12. The user 104 may use the webpage key points 20 to quickly understand the information of the webpage 12. As such, for information heavy webpages 12 (e.g., webpages with a large amount of information, long documents, hard to read text dense webpages, and/or content dense webpages that need more time investment from users), the webpage key points 20 may provide the user 104 with a summary or overview of the information contained in the webpage 12.

As the user 104 selects a new URL 14 for a new webpage 12, the new URL 14 is sent to the summary model 24 and new webpage key points 20 are determined for the new webpage 12 by the summary model 24. The new webpage key points 20 are sent to the browser 10 for presentation in the side pane 16. Thus, as the user 104 selects different webpages 12 to view, the webpage key points 20 presented in the side pane 16 change for the webpage 12 currently being viewed or engaged with by the user 104.

The environment 100 may have multiple machine learning models running simultaneously. For example, the plurality of machine learning models are used for the summary model 24. In some implementations, one or more computing devices are used to perform the processing of the environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the summary model 24 and/or the datastore 108 are implemented wholly on the same computing device. Another example includes one or more subcomponents of the browser 10, the summary model 24, and/or the datastore 108 implemented across multiple computing devices. Moreover, in some implementations, the browser 10, the summary model 24, and/or the datastore 108 are implemented or processed on different server devices of the same or different cloud computing networks. Moreover, in some implementations, the features and functionalities are implemented or processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

The environment 100 uses the summary model 24 to automatically identify the webpage key points 20 of the webpage 12 that is being viewed or engaged with by the user 104. The summary model 24 provides the webpage key points 20 for any domain by surfacing, based on the content within the webpage 12, webpage sentences 28, or phrases, for the webpage key points 20. The browser 10 presents the webpage key points 20 received from the summary model 24 in a side pane 16 adjacent to the webpage 12 that is being viewed or engaged with by the user 104. The webpage key points 20 help the user 104 easily understand what information is contained in the webpage 12.

Figure 2:
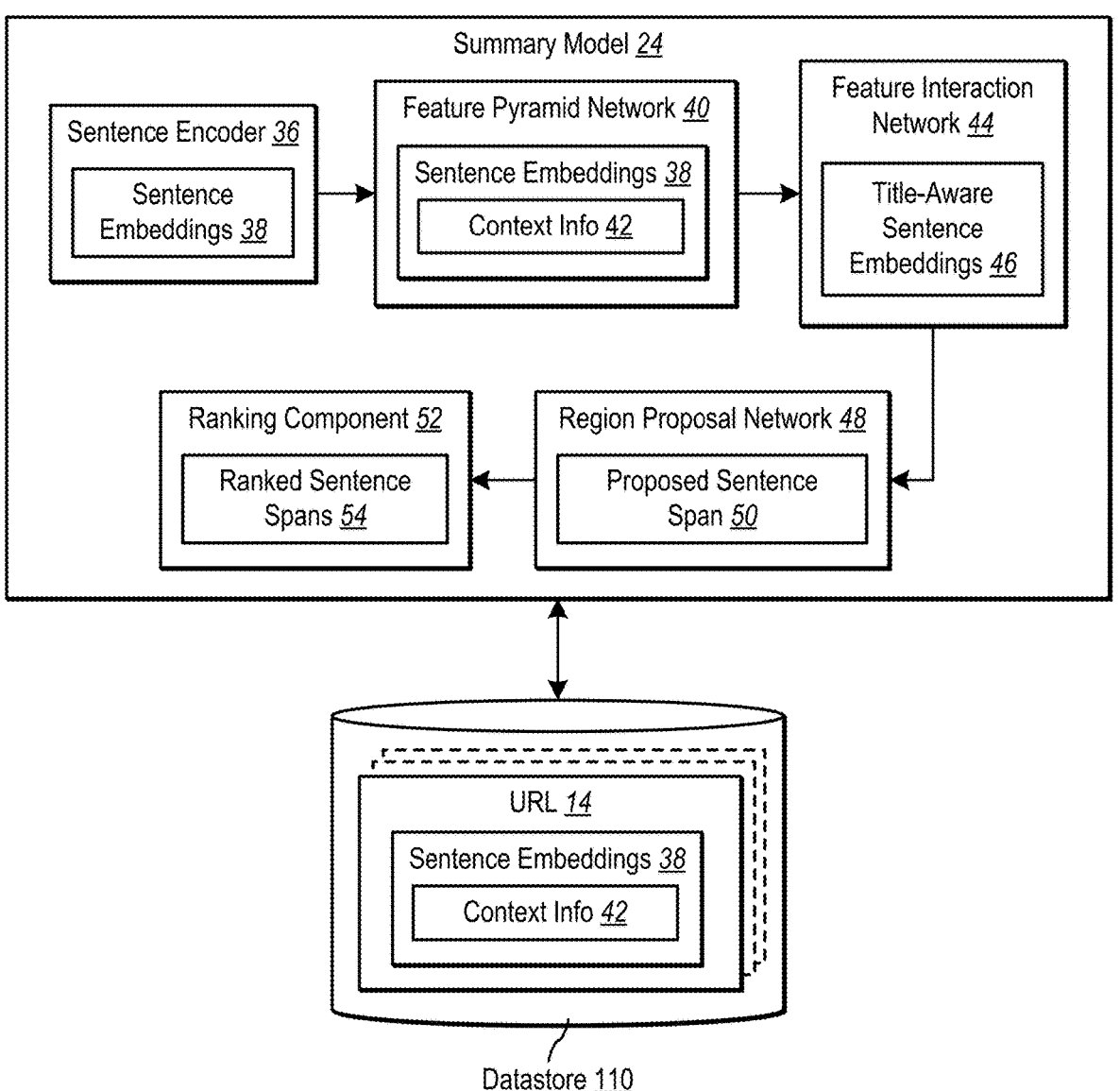
FIG. 2 illustrates example components of a summary model in accordance with implementations of the present disclosure.

Referring now to FIG. 2, illustrated is an implementation of the summary model 24 for use with the environment 100 (FIG. 1). In some implementations, the summary model 24 includes a plurality of machine learning models that analyze the webpage sentences 28 and/or the webpage title 26 to determine the webpage key points 20 based on the analysis of the webpage sentences 28 and/or the webpage title 26.

The summary model 24 includes a sentence encoder 36 that receives the webpage sentences 28 (FIG. 1) for the webpage 12 (FIG. 1) and maps the webpage sentences 28 to a distributed representation. The sentence encoder 36 generates independent sentence embeddings 38 for the webpage sentences 28. The sentence embeddings 38 generated by the sentence encoder 36 are not dependent on neighbors, resulting in independent sentence embeddings 38 based on the webpage sentences 28 without using a context of the webpage 12 or the webpage sentences 28.

In some implementations, the sentence encoder 36 is a transformer layer stacked machine learning model. The sentence encoder 36 uses a byte-pair-encoding algorithm to tokenize every sentence of the webpage sentences 28. The result tokens are encoded by the sentence encoder 36 to indexes. In some implementations, the indexes include a predefined vocabulary with a size of 250 k tokens. The sentence encoder 36 starts from an embedding layer where the token indexes and their position indexes are mapped to 384-dimension vectors and summed together.

In some implementations, the transformer layer of the sentence encoder 36 consists of an attention block having 6 attention heads where each head size is 64. The transformer layer is followed by a Feed Forward Network with an intermediate size of 1536 and uses GeLU as non-linear activation function.

In some implementations, there are 6 transformer layers stacked after the embedding layer in the sentence encoder 36, and the 384-dimension hidden states are fed into a Feed Forward Network with an intermediate size of 384 and uses a non-linear activation function (e.g., tanh). The final output vector whose size is 100 dimensions represents the sentence encoding (e.g., the independent sentence embeddings 38).

The sentence encoder 36 outputs the independent sentence embeddings 38 of the webpage 12 to a feature pyramid network 40. The feature pyramid network 40 injects context information 42 into the independent sentence embeddings 38. The feature pyramid network 40 models contextual interactions of the sentence embeddings 38. The feature pyramid network 40 uses convolutions around a window to get embeddings that are aggregated in nature, resulting in fusing the context information 42 to the sentence embeddings 38. For example, the feature pyramid network 40 applies a function of the context information 42 and the sentence embeddings 38 to fuse the context information 42 to the sentence embeddings 38 making the sentence embeddings contextual.

In some implementations, the independent sentence embeddings 38 are first stacked in document order (e.g., an order that the sentences occur in the webpage). The bottom-up pathway feature extraction layer consists of a one-dimensional (1$d$) convolution layer where the kernel size is 3, a padding size is 1, and an output number of channels is double the input number of channels, and a id max pooling layer follows where a kernel size is 2.

Two bottom-up layers are stacked after the input sequence of the sentence embeddings 38, where the sequence length is L, and outputs an intermediate result (including the very beginning output of stacking) of shape (L,384), (L//2,768), (L//4,1536) separately. The lateral connection layer is a one id convolution layer with a kernel size of 1 and an output number of channels fixed to 384.

The three intermediate outputs corresponding to the stacking and the two bottom-up layers are feed to three lateral connection layers separately and gets the results of shape (L,384), (L//2,384), (L//4,384) separately. The three results are up sampled by 2× and added to follow recursively in the reverse order. The output is reduced to single result of shape (L,384).

The de-aliasing layer is a id convolution layer where a kernel size is 3, a padding size is 1, and the input and output number of channels are both 384. The de-aliasing layer is the last layer of the feature pyramid network 40, taking the output of the previous layer. The output of the de-aliasing layer is of a shape (L, 384) and represents the non-local sentence embeddings 38 of the original document (e.g., the webpage 12) with the context information 42 infused.

The output of the feature pyramid network 40 (the non-local sentence embeddings 38 with the context information 42) is provided as input to the feature interaction network 44 that generates a title-aware sentence embedding 46. The feature pyramid network 40 interacts with the webpage title 26 to generate a title-aware sentence embedding 46. In some implementations, the feature interaction network 44 concatenates the independent title embedding (T) and the non-local sentence embeddings 38 (S) of the webpage sentences 28 and their non-linear combination T*S to get <T; S; T*S>, a vector with a size is 1152 dimensions, aware of the webpage title 26.

The output of the feature interaction network 44 (the title-aware sentence embedding 46) is provided to a region proposal network 48. The region proposal network 48 generates a proposed sentence span 50 for a summarization of the webpage 12. The region proposal network 48 predicts an importance of the proposed sentence spans 50 to form a summarization of the webpage 12. The proposed sentence spans 50 may come from different portions of the webpage 12.

In some implementations, the region proposal network 48 includes a first layer that is a Id convolution layer, where the kernel size equals a maximum span size of 5, the padding is half of the kernel size and equals 2. The input to the region proposal network 48 is the title-aware sentence embeddings 46, and the input and output number of channels are both 1152 dimensions, aligning to the embeddings.

In some implementations, the second layer of the region proposal network 48 is a ReLU non-linear activation layer and the third and last layer of the region proposal network 48 is a id convolution layer, where the kernel size is 1, and the input number of channels is 1152 dimensions. The output number of channels equals to $2^5-1=31$, where each output channel represents the logits of one possible sentence span nearby. The output after sigmoid function is a final confidence score used to propose the summary region. The region proposal network 48 uses the final confidence score to determine the proposed sentence span 50 of the summary of the webpage 12.

The proposed sentence span 50 is provided to a ranking component 52 that outputs ranked sentence spans 54. In some implementations, the ranking component 52 uses a non-maximum suppression algorithm to rank the sentence spans based on their final confidence scores in a descending order. The ranking component 52 sequentially picks the proposed sentence spans 50 that have a score over a threshold level and without overlapping with proposed sentence spans 50 already selected. The ranking component 52 generates ranked sentence spans 54 that form a final summarization of the webpage 12.

The ranking component 52 uses the ranked sentence spans 54 to generate the webpage key points 20. For example, the ranking component 52 uses the top 5 sentence spans of the ranked sentence spans 54 to generate the webpage key points 20. The summary model 24 outputs the webpage key points 20 based on the ranked sentence spans 54 to the browser 10 (FIG. 1) for presentation in the side pane 16 (FIG. 1).

In some implementations, the summary model 24 communicates with a datastore 110 that stores the sentence embeddings 38 generated by the sentence encoder 36 and/or the content information 42 generated for the sentence embeddings 38 for each of the URLs 14. The summary model 24 sends the sentence embeddings 38 to the datastore 110 for storage and the sentence embeddings 38 may be reused by the summary model 24. For example, if a user 104 (FIG. 1) visits a URL 14 that already has the sentence embeddings 38 generated, the summary model 24 may access the sentence embeddings 38 from the datastore 110 instead of the sentence encoder 36 generating the sentence embeddings 38 for the URL 14. Another example includes if the user 104 revisits a URL 14 (e.g., switching between different webpages 12), the summary model 24 may access the sentence embeddings 38 from the datastore 110 instead of the sentence encoder 36 generating the sentence embeddings 38 for the URL 14 again.

The sentence embeddings 38 may be generated upon receipt of the URL 14 from the browser 10. In addition, the sentence embeddings 38 may already be generated for the URL 14 (e.g., generated offline or previously generated by the sentence encoder 36) and obtained by the summary model 24 from the datastore 110. In some implementations, the summary model 24 may send the context information 42 to the datastore 110 and/or obtain the context information 42 from the datastore 110. The sentence embeddings 38 and/or the context information 42 may be refreshed automatically in the datastore 110 as the content of the webpages 12 changes, keeping the correct information for the sentence embeddings 38 and the context information 42 in the datastore 110.

Thus, the sentence embeddings 38 and the context information 42 may already be generated for the URL 14 and may be obtained from the summary model 24 for use with determining the webpage key points 20. By reusing the sentence embeddings 38 and/or the context information 42, the summary model 24 may generate the webpage key points 20 faster.

Figure 3:
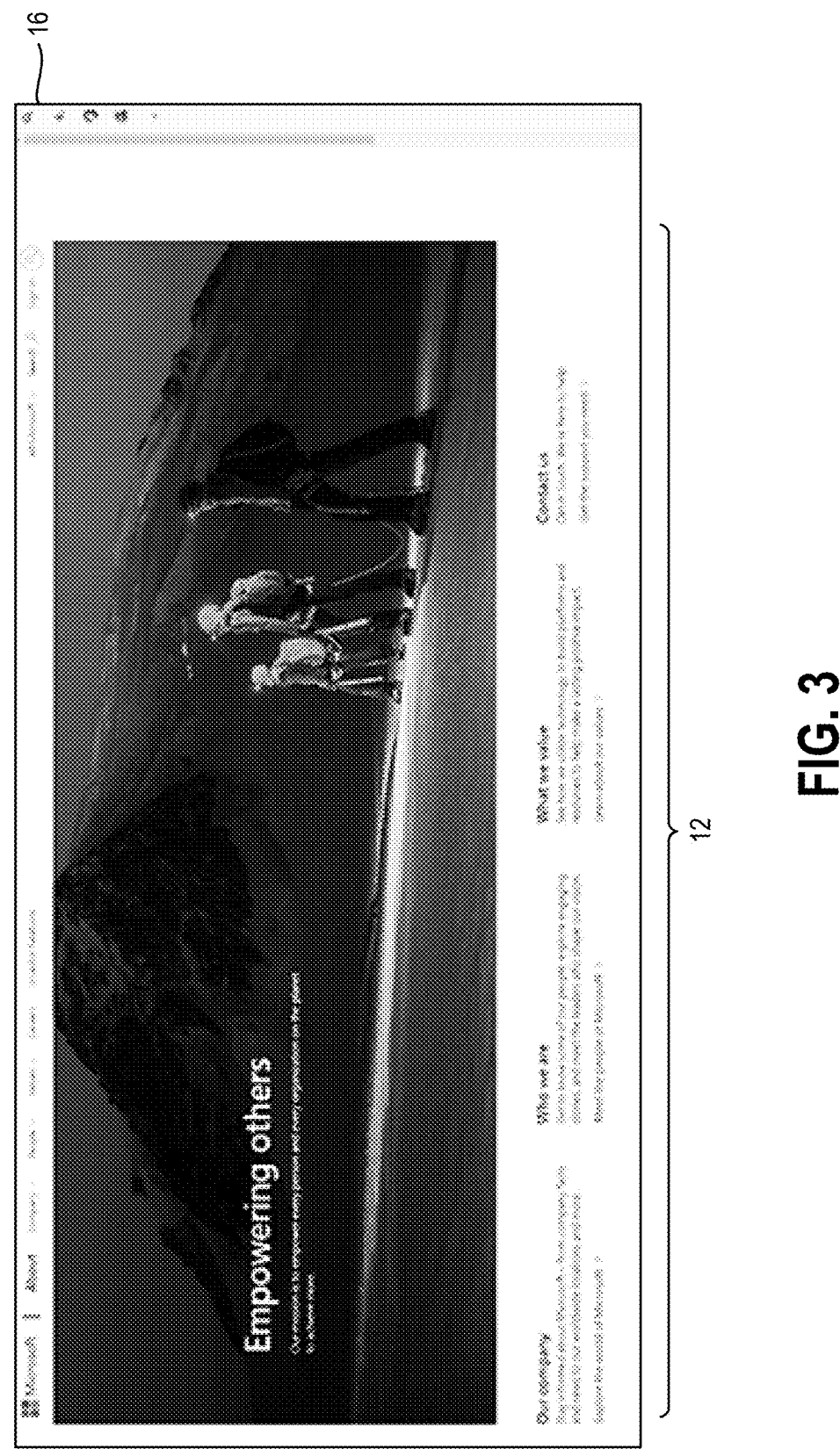
FIG. 3 illustrates an example graphical user interface of a browser displaying a webpage and a side pane in accordance with implementations of the present disclosure.

Referring now to FIG. 3, illustrated is an example graphical user interface (GUI) 300 of a browser 10 (FIG. 1) displaying a webpage 12 and a side pane 16. The side pane 16 includes an icon 18 that the user 104 (FIG. 1) may select to provide webpage key points 20 (FIG. 1) for the webpage 12. If the user 104 hovers over the icon 18, information is presented to the user 104 indicating that webpage key points 20 may be available for the webpage 12.

Figure 4:
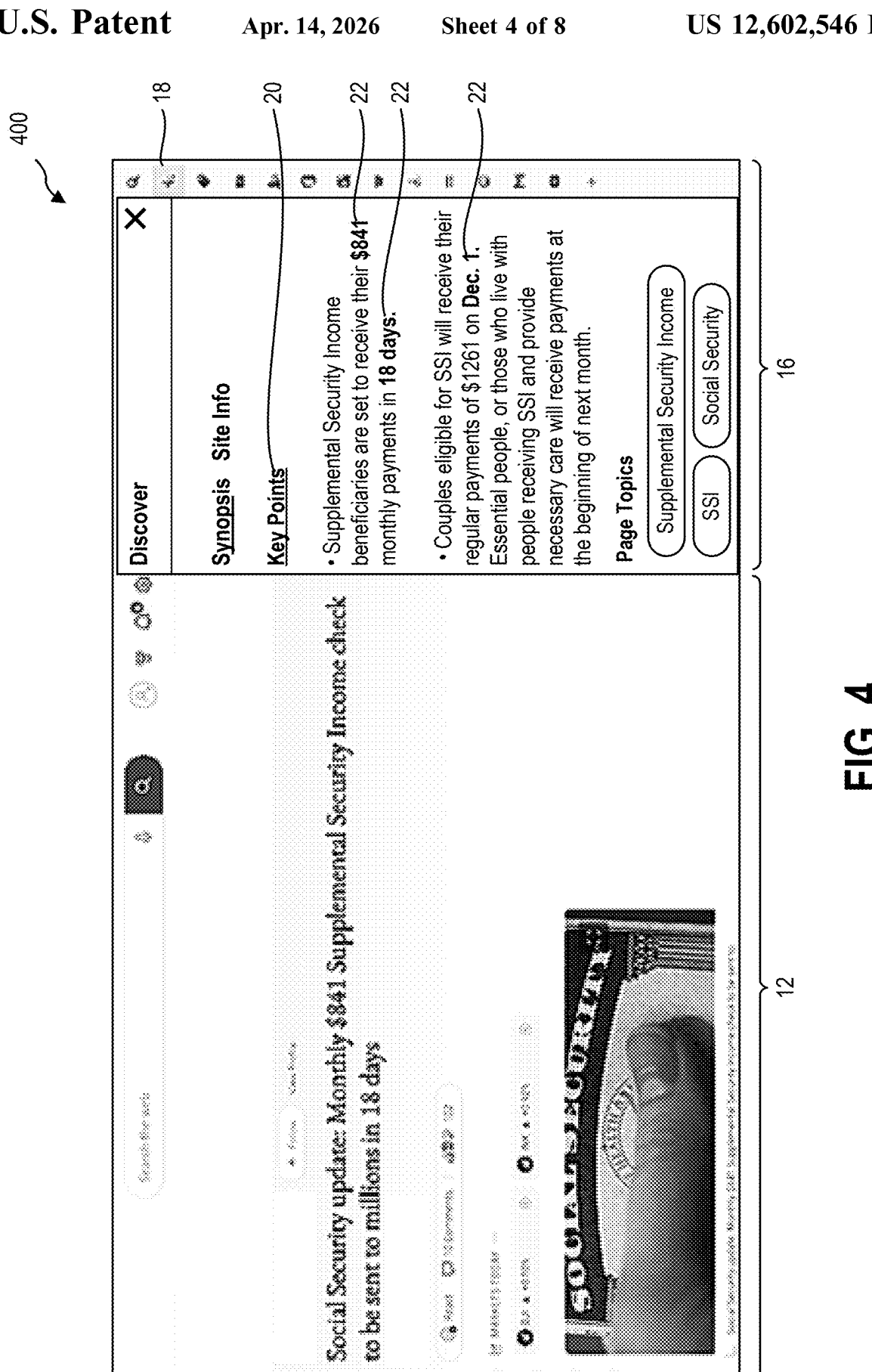
FIG. 4 illustrates an example graphical user interface of a browser displaying a webpage and a side pane with webpage key points in accordance with implementations of the present disclosure.

Referring now to FIG. 4, illustrated is an example GUI 400 of a browser 10 (FIG. 1) displaying the webpage 12 illustrated in FIG. 3 and the side pane 16 with the webpage key points 20. The webpage key points 20 may be presented in response to the user 104 (FIG. 1) selecting the icon 18. The browser 10 may send the URL 14 (FIG. 1) of the webpage 12 being viewed by the user 104 to the summary model 24 (FIG. 1). The summary model 24 may analyze the content of the webpage 12 (e.g., the webpage sentences 28) and the webpage title 26 (FIG. 1) and generate the webpage key points 20 based on the analysis of the webpage content and the webpage title 26. The webpage key points 20 are different webpage sentences 28 obtained from the webpage 12 that summarize the content of the webpage 12 for the user 104. The webpage key points 20 also include a highlight 22 that visually distinguishes identified terms ($841, 18 days, and December 1) in the webpage key points 20 by bolding the identified terms.

Figure 5:
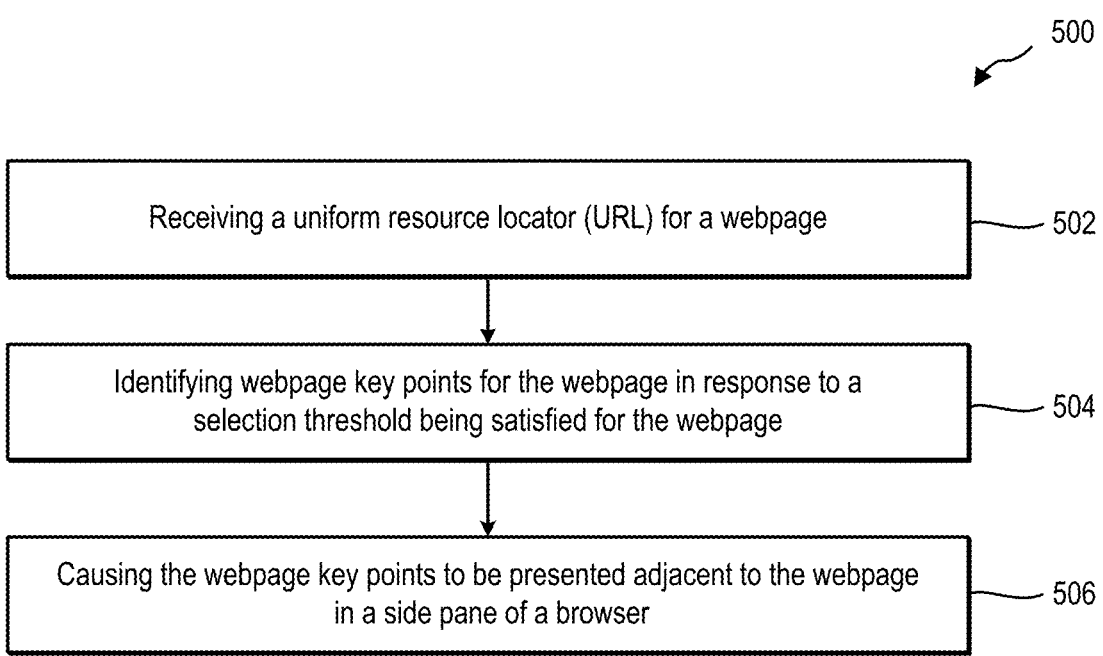
FIG. 5 illustrates an example method for identifying webpage key points in accordance with implementations of the present disclosure.

Referring now to FIG. 5, illustrated is an example method 500 for identifying webpage key points. The actions of the method 500 are discussed below with reference to the architectures of FIGS. 1 and 2.

At 502, the method 500 includes receiving a URL of a webpage. A summary model 24 receives the request with the URL 14 of the webpage 12 for the webpage key points 20. In some implementations, the summary model 24 obtains the webpage title 26 and the webpage sentences 28 for the URL 14 from a web index 35 stored in a datastore 108.

At 504, the method 500 includes identifying webpage key points for the webpage in response to a selection threshold being satisfied for the webpage. The summary model 24 determines that a selection threshold 30 is satisfied for the webpage 12 based on the webpage title 26 and the webpage sentences 28. The summary model 24 uses the selection threshold 30 to determine whether to identify the webpage key points 20 for the webpage 12. The selection threshold 30 identifies whether the webpage 12 is a candidate for summarization based on the webpage title 26 and the content of the webpage 12 and controls whether the webpage key points 20 are identified for the webpage 12. The selection threshold 30 indicates whether the webpage 12 is a good candidate to summarize (e.g., the webpage has enough content to summarize, a correct type of content to summarize, the webpage is a long document, and/or the webpage is a text dense or content dense webpage that needs more time investment from users). If the output is below the selection threshold 30, the summary model 24 skips identifying the webpage key points 20 for the webpage 12.

If the webpage 12 satisfies the selection threshold 30 (e.g., the output is equal to or above the selection threshold 30), the summary model 24 automatically identifies the webpage key points 20 for the webpage 12. The summary model 24 is a trained machine learning model that receives the webpage title 26 and the webpage sentences 28 as input and analyzes the webpage sentences 28 in the context of the webpage title 26 to identify the webpage key points 20. In some implementations, the summary model 24 includes a plurality of machine learning models that analyze the webpage sentences 28 and/or the webpage title 26 to determine the webpage key points 20.

The webpage key points 20 are sentences or phrases obtained directly from the content of the webpage 12 that provide a summarization of the content of the webpage 12. The summary model 24 uses the webpage title 26 to aid in selecting which sentence spans to use for the webpage key points 20.

At 506, the method 500 includes causing the webpage key points to be presented adjacent to the webpage in a side pane of a browser. The summary model 24 provides the webpage key points 20 to the browser 10 in near real time of receiving the request with the URL 14 of the webpage 12 for presentation in a side pane 16 of the browser 10.

In some implementations, the summary model 24 uses a presentation threshold 32 to determine whether to provide the webpage key points 20 to the browser 10 for presentation. The presentation threshold 32 identifies a confidence level in a summary provided by the webpage key points 20 of the webpage 12 and controls whether the webpage key points 20 are sent for presentation on the browser 10. For example, the presentation threshold 32 is a configurable threshold that is a positive number between 0 and 1. The presentation threshold 32 may be used by the summary model 24 to determine whether the webpage key points 20 provide a good summary of the webpage 12. The summary model 24 may analyze the webpage key points 20 and provide an output based on the analysis of the webpage key points 20. If the output is below the presentation threshold 32, the summary model 24 may skip sending the webpage key points 20 to the browser 10 for presentation. If the output is equal to, or exceeds, the presentation threshold 32, the summary model 24 sends the webpage key points 20 to the browser 10 for presentation in the side pane 16 of the browser 10.

In some implementations, the summary model 24 selects terms 34 in the webpage key points 20 to highlight. For example, the selected terms 34 are phrases or quotes in the webpage key points 20. Another example includes the selected terms 34 are locations discussed in the webpage 12. Another example includes the selected terms 34 are statistics mentioned in the webpage 12. The summary model 24 sends the selected terms 34 and the webpage key points 20 to be presented in the side pane 16 of the browser 10.

The browser 10 presents the webpage key points 20 in the side pane 16 with a highlight 22 for the identified terms 34. The highlight 22 visually distinguishes the selected terms 34 in the webpage key points 20. For example, the highlight 22 bolds the selected terms 34. Another example includes the highlight 22 changes the color of the selected terms 34. Another example includes the highlight 22 adds a color overlay to the selected terms 34.

As such, the method 500 automatically identifies the webpage key points 20 for the webpage 12.

Referring now to FIG. 6, illustrated is an example method 600 for identifying webpage key points. The actions of the method 600 are discussed below with reference to the architectures of FIGS. 1 and 2.

At 602, the method 600 includes obtaining webpage sentences for the webpage. A summary model 24 receives the request with the URL 14 of the webpage 12 for the webpage key points 20. In some implementations, the summary model 24 obtains the webpage title 26 and the webpage sentences 28 for the URL 14 from a web index 35 stored in a datastore 108.

At 604, the method 600 includes mapping the webpage sentences to a distributed representation. In some implementations, the summary model 24 includes a sentence encoder 36 that receives the webpage sentences 28 for the webpage 12 and maps the webpage sentences 28 to a distributed representation. The sentence encoder 36 generates sentence embeddings 38 for the webpage sentences 28 that are independent of the context of the webpage 12. The sentence embeddings 38 generated by the sentence encoder 36 are not dependent on neighbors, resulting in independent sentence embeddings 38 based on the webpage sentences 28 without using context. In some implementations, the sentence encoder 36 is a transformer layer stacked machine learning model.

At 606, the method 600 includes providing contextual interactions to the webpage sentences. The sentence encoder 36 outputs the independent sentence embeddings 38 of the webpage 12 to a feature pyramid network 40. The feature pyramid network 40 fuses context information 42 into the sentence embeddings 38. The feature pyramid network 40 models contextual interactions of the sentence embeddings 38. The feature pyramid network 40 uses convolutions around a window to get embeddings that are aggregated in nature, resulting in fusing the context information 42 to the sentence embeddings 38. For example, the feature pyramid network 40 applies a function of the context information 42 and the sentence embeddings 38 to fuse the context information 42 to the sentence embeddings 38 making the sentence embeddings contextual.

The output of the feature pyramid network 40 (the non-local sentence embeddings 38 with the context information 42) is provided as input to the feature interaction network 44 that generates a title-aware sentence embedding 46. The feature interaction network 44 interacts with the webpage title 26 to generate a title-aware sentence embedding 46 for the webpage 12. In some implementations, the feature interaction network 44 concatenates the independent title embedding (T) and the non-local sentence embeddings 38 (S) of the webpage sentences 28 and their non-linear combination T\*S to get <T; S; T\*S>, a vector where a size is 1152 dimensions, aware of the webpage title 26.

At 608, the method 600 includes predicting an importance of sentence spans of the webpage sentences. The output of the feature interaction network 44 (the title-aware sentence embedding 46) is provided to a region proposal network 48. The region proposal network 48 generates proposed sentence spans 50 using the title-aware sentence embeddings 46. The proposed sentence spans 50 provide a summary of content of the webpage 12. The region proposal network 48 predicts an importance of the proposed sentence spans 50 to form a summarization of the webpage 12. The proposed sentence spans 50 may come from different portions of the webpage 12.

At 610, the method 600 includes selecting sentence spans based on the ranking of the sentence spans. The proposed sentence span 50 is provided to a ranking component 52 that outputs ranked sentence spans 54. In some implementations, the ranking component 52 uses a non-maximum suppression algorithm to rank the proposed sentence spans 50 in descending order based on a confidence score of a summary provided by the proposed sentence spans 50. The ranking component 52 sequentially picks the proposed sentence spans 50 that have a score over a threshold level and removing overlapping proposed sentence spans 50 already selected. The ranking component 52 generates ranked sentence spans 54 that form a final summarization of the webpage 12.

At 612, the method 600 includes identifying the selected sentence spans as the webpage key points. The ranking component 52 uses the ranked sentence spans 54 to identify the webpage key points 20. For example, the ranking component 52 uses the top 5 sentence spans of the ranked sentence spans 54 to generate the webpage key points 20. The summary model 24 outputs the webpage key points 20 based on the ranked sentence spans 54 to the browser 10 (FIG. 1) for presentation in the side pane 16 (FIG. 1).

The method 600 uses a plurality of machine learning models that analyze the webpage sentences 28 and/or the webpage title 26 to automatically determine the webpage key points 20 obtained from sentences or phrases in the webpage 12.

Referring now to FIG. 7, illustrated is an example method 700 for presenting webpage key points. The actions of the method 700 are discussed below with reference to the architectures of FIGS. 1 and 2.

At 702, the method 700 includes presenting, on the browser, a webpage and a side pane with an icon adjacent to the webpage. The browser 10 may have a user interface rendering component that presents the requested webpage 12 on the display. The user interface rendering component may also present a side pane 16 with icons 18 that the user 104 may select to present additional information or content. In some implementations, the icon 18 triggers presentation of the webpage key points 20 in the side pane 16. The side pane 16 may be presented next to or adjacent to the webpage 12. For example, the side pane 16 is presented by the user interface rendering component on a right side of the webpage 12. The side pane 16 may be positioned at the right rail of the browser 10. The side pane 16 is opened either reactively by the user 104 selecting the icon 18 or automatically as the user 104 selects a webpage 12.

At 704, the method 700 includes sending, in response to a selection of the icon, a uniform resource locator (URL) of the webpage to a summary model with a request for webpage key points. In some implementations, the user 104 selects the icon 18 to trigger presentation of webpage key points 20 in the side pane 16. The browser 10 sends a request with the URL 14 of the webpage 12 to a server 106 for the webpage key points 20. In some implementations, the browser 10 sends the request for the webpage key points 20 in response to the user 104 selecting the icon 18. In some implementations, the browser 10 automatically sends the request for the webpage key points 20 in response to the user 104 selecting the URL 14 for the webpage 12.

The server 106 includes a summary model 24 that receives the request with the URL 14 of the webpage 12 for the webpage key points 20 and automatically identifies the webpage key points 20. In some implementations, the summary model 24 is a plurality of machine learning models that analyze the webpage sentences 28 of the webpage 12 and a webpage title 26 to determine the webpage key points 20.

At 706, the method 700 includes receiving, from the summary model based on the URL of the webpage, the webpage key points for the webpage. The browser 10 receives the webpage key points 20 from the summary model 24. In some implementations, the webpage key points 20 are sentences obtained directly from the content of the webpage 12. In some implementations, the webpage key points 20 are phrases obtained directly from the content of the webpage 12.

At 708, the method 700 includes presenting, in the side pane, the webpage key points in response to a selection of the icon. The browser 10 presents the webpage key points 20 in the side pane 16 adjacent to the webpage 12 that is being viewed or engaged with by the user 104. The browser 10 presents the webpage key points 20 in the side pane 16 in near real time in response to the user 104 requesting the URL 14 of the webpage 12. The webpage key points 20 help the user 104 easily understand what information is contained in the webpage 12.

In some implementations, the summary model 24 identifies terms 34 in the webpage key points 20 to highlight. The browser 10 presents the webpage key points 20 in the side pane 16 and provides a highlight 22 for the identified terms 34 that visually distinguishes the terms 34 in the webpage key points 20. For example, the highlight 22 bolds the identified terms 34. Another example includes the highlight 22 changing the color of the identified terms 34. Another example includes the highlight 22 adding a color overlay to the identified terms 34.

Figure 8:
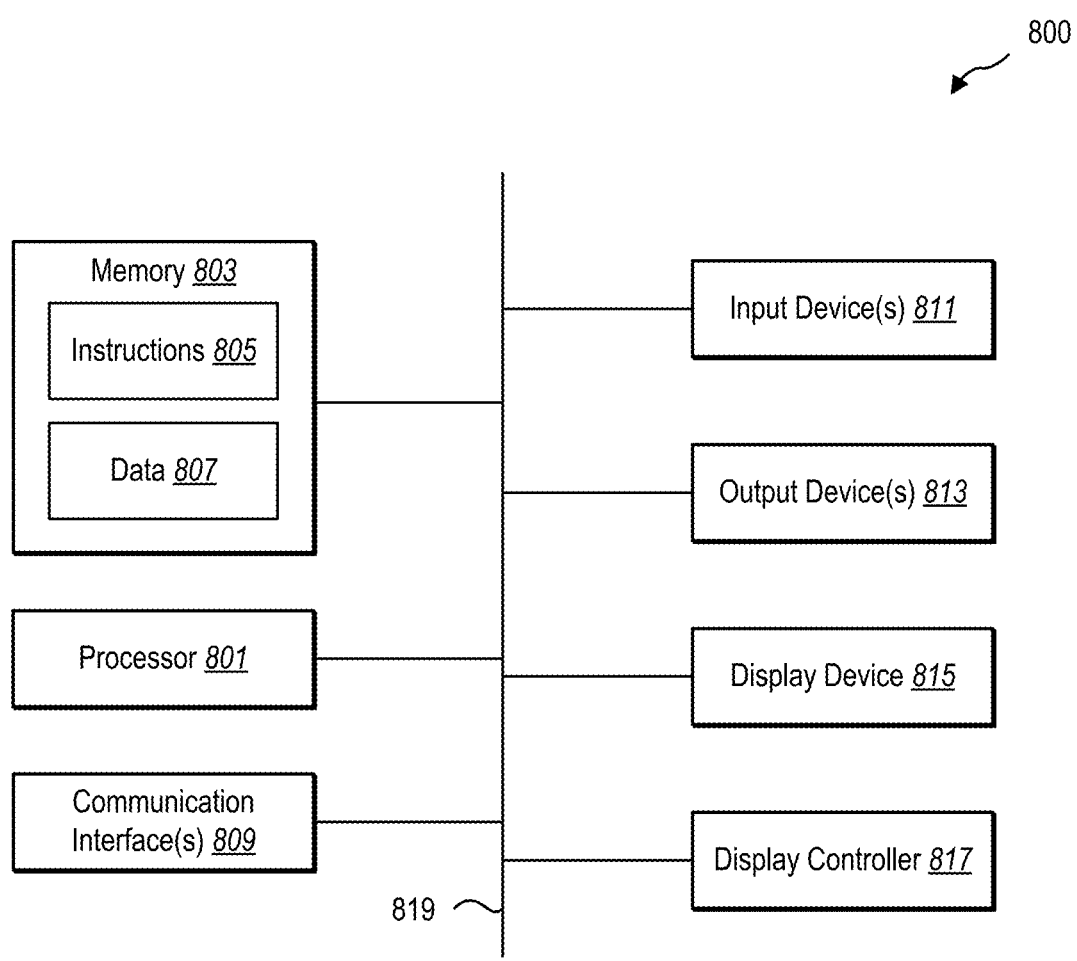
FIG. 8 illustrates components that may be included within a computer system.

FIG. 8 illustrates components that may be included within a computer system 800. One or more computer systems 800 may be used to implement the various methods, devices, components, and/or systems described herein.

The computer system 800 includes a processor 801. The processor 801 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a binary model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving a uniform resource locator (URL) of a webpage presented on a browser;
   determining that a selection threshold is satisfied for the webpage based on a webpage title of the webpage and content of the webpage, wherein satisfying the selection threshold results in providing a summarization of content from the webpage;
   identifying, using a machine learning model, webpage key points that summarize content from the webpage, wherein the webpage key points are obtained from the webpage;
   analyzing a summary length of the webpage key points and the summarized content from the webpage;
   causing the webpage key points to be presented adjacent to the webpage in a side pane of the browser in near real time of receiving the URL of the webpage in response to determining the summary length and the summarized content provides a value that is above a presentation threshold, wherein the presentation threshold controls whether the webpage key points are sent for presentation on the browser; and
   causing a browser notification to be presented indicating that the webpage key points are unavailable in response to determining that the summary length and the summarized content provides a value that is below the presentation threshold.

2. The method of claim 1, further comprising:
   obtaining webpage sentences for the webpage;

mapping the webpage sentences to a distributed representation;

providing contextual interactions to the webpage sentences; and predicting an importance of sentence spans of the webpage sentences.

3. The method of claim 2, wherein identifying the webpage key points further comprises:

selecting sentence spans based on a ranking of the sentence spans; and identifying the selected sentence spans as the webpage key points.

4. The method of claim 2, wherein mapping the webpage sentences to the distributed representation further comprises:

generating sentence embeddings for the webpage sentences that are independent of a context of the webpage.

5. The method of claim 4, wherein providing the contextual interactions to the webpage sentences further comprises:

fusing context information to the sentence embeddings; and generating title-aware sentence embeddings for the webpage.

6. The method of claim 5, wherein predicting the importance of the sentence spans of the webpage sentences further comprises:

generating proposed sentence spans using the title-aware sentence embeddings, wherein the proposed sentence spans provide a summary of content of the webpage.

7. The method of claim 6, wherein ranking the sentence spans of the webpage sentences further comprises:

ranking the proposed sentence spans in descending order based on a confidence score of a summary provided by the proposed sentence spans; and removing overlapping proposed sentence spans.

8. The method of claim 1, further comprising:

selecting terms in the webpage key points; and sending the terms and the webpage key points to be presented in the side pane of the browser, wherein a highlight is applied to the terms that visually distinguishes the terms in the webpage key points.

9. The method of claim 1, further comprising:

comparing the webpage key points to the presentation threshold; and sending, in response to the webpage key points being equal to the presentation threshold or exceeding the presentation threshold, the webpage key points for presentation in the side pane of the browser.

10. The method of claim 9, wherein the presentation threshold identifies a confidence level in a summary provided by the webpage key points of the webpage.

11. The method of claim 9, wherein the selection threshold controls whether the webpage key points are provided for the webpage.

12. A device, comprising:

a memory to store data and instructions; and a processor operable to communicate with the memory, wherein the processor is operable to:

receive a uniform resource locator (URL) of a webpage presented on a browser;

determine that selection threshold is satisfied for the webpage based on a webpage title of the webpage and content of the webpage, wherein satisfying the selection threshold results in providing a summarization of content from the webpage;

analyze a summary length of the webpage key points and the summarized content from the webpage;

identify webpage key points that summarize content from the webpage in response to the selection threshold being satisfied for the webpage, wherein the webpage key points are obtained from the webpage;

cause the webpage key points to be presented in a side pane of a browser nearby the webpage in near real time of receiving the URL of the webpage in response to determining the summary length and the summarized content provides a value that is above a presentation threshold, wherein the presentation threshold controls whether the webpage key points are sent for presentation on the browser; and cause a browser notification to be presented indicating that the webpage key points are unavailable in response to determining that the summary length and the summarized content provides a value that is below the presentation threshold.

13. The device of claim 12, wherein the processor is further operable to use a plurality of machine learning models to identify the webpage key points.

14. The device of claim 12, wherein the processor is further operable to identify webpage key points for the webpage by:

obtaining, from a datastore, sentence embeddings for the webpage and context information for the sentence embeddings;

generating title-aware sentence embeddings for the webpage using the sentence embeddings and the context information;

generating proposed sentence spans using the title-aware sentence embeddings, wherein the proposed sentence spans provide a summary of content of the webpage;

selecting sentence spans based on a ranking of the proposed sentence spans; and identifying the selected sentence spans as the webpage key points.

15. The device of claim 12, wherein the processor is further operable to:

select terms in the webpage key points; and send the terms and the webpage key points for presentation in the side pane of the browser, wherein a highlight is applied to the terms that visually distinguishes the terms in the webpage key points.

16. The device of claim 12, wherein the processor is further operable to:

compare the webpage key points to the presentation threshold; and send, in response to the webpage key points being equal to the presentation threshold or exceeding the presentation threshold, the webpage key points for presentation in the side pane of the browser.

17. A device, comprising:

a memory to store data and instructions; and a processor operable to communicate with the memory, wherein the processor is operable to:

present, on a browser, a webpage and a side pane with an icon adjacent to the webpage;

send, by the browser, in response to a selection of the icon, a uniform resource locator (URL) of the webpage to a summary model with a request for webpage key points;

receive, from the summary model based on the URL of the webpage and the webpage satisfying a selection threshold, the webpage key points for the webpage, wherein the webpage key points are obtained from content of the webpage and summarize the content of the webpage;

present, in the side pane of the browser, the webpage key points in near real time in response to a selection of the icon in response to a determination by the summary model that the summary length and the summarized content provides a value that is above a presentation threshold, wherein the presentation threshold controls whether the webpage key points are sent for presentation on the browser; and present a browser notification indicating that the webpage key points are unavailable in response to the summary model determining that the summary length and the summarized content provides a value that is below the presentation threshold.

18. The device of claim 17, wherein the processor is further operable to:

provide a highlight of terms in the webpage key points that visually distinguishes the terms.

19. The device of claim 17, wherein the summary model is a plurality of machine learning models that analyze webpage sentences of the webpage and a webpage title to determine the webpage key points.

20. The device of claim 17, wherein the webpage key points are sentences or phrases obtained from different portions of the webpage.

* * * * *